US012606656B2

(12) United States Patent
Ngo et al.

(10) Patent No.: US 12,606,656 B2

(45) Date of Patent: Apr. 21, 2026

(54) TELECHELIC POLYMERS BASED ON ETHYLENE AND 1,3 DIENE

(71) Applicants: COMPAGNIE GENERALE DES ETABLISSEMENTS MICHELIN, Clermont-Ferrand (FR); CENTRE NATIONAL DE LA RECHERCHE SCIENTIFIQUE, Paris (FR); ECOLE SUPÉRIEURE DE CHIMIE PHYSIQUE ELECTRONIQUE DE LYON, Villeurbanne (FR); UNIVERSITÉ CLAUDE BERNARD LYON 1, Villeurbanne (FR)

(72) Inventors: Robert Ngo, Clermont-Ferrand (FR); Nicolas Baulu, Clermont-Ferrand (FR); Christophe Boisson, Tramoyes (FR); Franck D'Agosto, Genas (FR); François Jean-Baptiste-Dit-Dominique, Clermont-Ferrand (FR); Julien Thuilliez, Clermont-Ferrand (FR)

(73) Assignees: COMPAGNIE GENERALE DES ETABLISSEMENTS MICHELIN, Clermont-Ferrand (FR); CENTRE NATIONAL DE LA RECHERCHE SCIENTIFIQUE, Paris Cedex (FR); ECOLE SUPERIEURE DE CHIMIE PHYSIQUE ELECTRONIQUE DE LYON, Vitieurbanne Cedex (FR); UNIVERSITE CLAUDE BERNARD LYON 1, Vitieurbanne Cedex (FR)

( * ) Notice: Subject to any disclaimer, the term of this patent is extended or adjusted under 35 U.S.C. 154(b) by 533 days.

(21) Appl. No.: 18/038,470

(22) PCT Filed: Nov. 19, 2021

(86) PCT No.: PCT/FR2021/052046

§ 371 (c)(1),
(2) Date: May 24, 2023

(87) PCT Pub. No.: WO2022/112693

PCT Pub. Date: Jun. 2, 2022

(65) Prior Publication Data

US 2024/0010767 A1 Jan. 11, 2024

(30) Foreign Application Priority Data

Nov. 24, 2020 (FR) ...................................... 2012083

(51) Int. Cl.

| | |
|---|---|
| ***C08F 210/02*** | (2006.01) |
| ***C08F 4/10*** | (2006.01) |
| ***C08F 4/50*** | (2006.01) |
| ***C08F 8/30*** | (2006.01) |
| ***C08F 8/42*** | (2006.01) |
| ***C08F 236/04*** | (2006.01) |

(52) U.S. Cl.

CPC .............. *C08F 210/02* (2013.01); *C08F 4/10* (2013.01); *C08F 4/50* (2013.01); *C08F 8/30* (2013.01); *C08F 8/42* (2013.01)

(58) Field of Classification Search

CPC .................................... C08F 4/10; C08F 4/50

See application file for complete search history.

(56) References Cited

U.S. PATENT DOCUMENTS

2024/0043600 A1* 2/2024 Baulu .................. C08F 210/02

FOREIGN PATENT DOCUMENTS

| | | | | |
|---|---|---|---|---|
| EP | 1092731 A1 | 4/2001 | | |
| EP | 1314744 A2 | 11/2002 | | |
| FR | 2893030 A1 * | 5/2007 | ............ | C08F 210/00 |
| FR | 3044663 A1 | 6/2017 | | |
| WO | 2004035639 A1 | 4/2004 | | |
| WO | 2007054223 A2 | 5/2007 | | |
| WO | 2007054224 A2 | 5/2007 | | |
| WO | 2008027269 A2 | 3/2008 | | |
| WO | 2013135314 A1 | 9/2013 | | |
| WO | 2016092237 A1 | 6/2016 | | |
| WO | 2017093654 A1 | 6/2017 | | |
| WO | WO-2017097831 A1 * | 6/2017 | ............ | C08F 4/6392 |
| WO | 2018020122 A1 | 2/2018 | | |
| WO | 2018224774 A1 | 12/2018 | | |
| WO | 2018224776 A1 | 12/2018 | | |
| WO | 2020128196 A1 | 6/2020 | | |

OTHER PUBLICATIONS

"Design of Selective Divalent Chain Transfer Agents for Coordinative Chain Transfer Polymerization of Ethylene and its Copolymerization with Butadiene" authored by Baulu et al. and published in Polymer Chemistry (2022) 13, 1970.*

Machine translation of WO 2017/097831 (no date).*

Jerry March, "Advanced Organic Chemistry," 4th Edition, 1992, pp. 622-623.

Gary S. Silverman, Philip E. Rakita, "Handbook of Grignard Reagents," 1996, pp. 502-503.

International Search Report (ISR) for International Application No. PCT/FR2021/052046 mailed Feb. 18, 2022, 4 pages.

* cited by examiner

*Primary Examiner* — Marc S Zimmer

(74) *Attorney, Agent, or Firm* — Dickinson Wright PLLC

(57) ABSTRACT

A telechelic polymer of formula $Z_1$-POLY-$Z_2$ is provided. The term "POLY" denotes a polymer chain comprising units of a 1,3-diene, ethylene units and cyclic units, 1,2-cyclohexane units, $Z_1$ and $Z_2$ denoting a group containing a function, $Z_1$ and $Z_2$ being identical. The polymer has a macrostructure defined by a dispersity of less than 1.5 or by a number-average molar mass of greater than 10 000 g/mol.

14 Claims, No Drawings

TELECHELIC POLYMERS BASED ON ETHYLENE AND 1,3 DIENE

This U.S. patent application is a national phase entry of international patent application no. PCT/FR2021/052046, filed Nov. 19, 2021, which claims priority to French patent application no. FR2012083, filed Nov. 24, 2020, the entire contents of which are incorporated herein by reference in their entirety.

BACKGROUND

1. Technical Field

The field of the present invention is that of telechelic copolymers based on ethylene and 1,3-diene.

2. Related Art

Copolymers of ethylene and 1,3-diene are widely described. They are generally obtained by catalytic polymerization of ethylene and a 1,3-diene in the presence of a metallocene and a co-catalyst. In EP 1 092 731, WO 2004/035639, WO 2007/054224 and WO 2018/224776, the ethylene and 1,3-diene copolymers have the particular feature of having an original microstructure, since they also contain 6-membered cyclic units resulting from a very particular insertion of ethylene and 1,3-butadiene. This original microstructure is also observed in terpolymers based on ethylene, 1,3-butadiene and another monomer, as described, for example, in WO 2020/128196 A1.

In the synthesis of these polymers, the co-catalyst is an organolithium, organomagnesium or organoaluminium reagent. When the co-catalyst is an organomagnesium reagent, it is typically an organomagnesium chloride or an organomagnesium reagent in which the magnesium atom is bonded to two aliphatic groups, such as dibutylmagnesium, butylethylmagnesium and butyloctylmagnesium.

Functional copolymers of ethylene and 1,3-diene were also described. They are obtained by a functionalization reaction subsequent to the polymerization reaction and which is performed by adding a modifying agent, generally at the end of the polymerization. This first method allows the functionalization of only one chain end of the polymer. An alternative to this first method was to propose the use of functional transfer agents instead of co-catalysts. These functional transfer agents described in patent applications WO 2016/092237 and WO 2013/135314 are, for example, organomagnesium reagents bearing an amine, ether or vinyl function. This alternative indeed makes it possible to omit the additional functionalization step after the polymerization reaction to form functional polymers. However, this alternative leads, like the first method, to the functionalization of only one chain end of the polymer, unless an additional functionalization step is performed at the end of the polymerization.

The synthesis of telechelic copolymers of ethylene and 1,3-diene thus requires a combination of the two functionalization methods described above. As the chemistries involved respectively in the two functionalization methods are different, the groups which bear the function and which link the function to the end unit of the polymer chain are different functional groups, even though the function is identical at both ends. In other words, the functional group borne by one end of a chain is not strictly identical to the functional group borne by the other end of the chain.

However, it may be of interest to have copolymers of ethylene and a 1,3-diene bearing strictly identical functional groups at the ends of the polymer chain, for example to obtain polymers whose chain ends are of identical reactivity, or even to obtain perfectly symmetrical polymers, without any heterogeneity of structure and reactivity.

1,3-butadiene homopolymers or copolymers functionalized at both chain ends with identical and partially hydrogenated groups have been described in patent application EP 1314744 A2. The introduction of the functional groups at both chain ends is performed by using a dilithiated initiator in an anionic polymerization mechanism. The functional polymer thus synthesized has a macrostructure and microstructure derived from that of a polymer synthesized by anionic polymerization. As a result, a relatively narrow molecular distribution of the functional polymer may be obtained, but the microstructures of the functional polymer are only those accessible by anionic polymerization.

Copolymers of propylene and 1,3-butadiene functionalized at both chain ends with identical groups, in this case vinyl, are also described, for example, in WO 2008/27269 A2. The introduction of the functional groups at the ends of the polymer is performed by degradation reaction of a copolymer of propylene and 1,3-butadiene in the presence of ethylene. Due to the reaction mechanism of degradation of the polymer chain by metathesis, the molecular distribution of the functional polymer is broad and the number-average molecular masses are relatively low.

SUMMARY

The Applicants have developed a novel copolymer based on ethylene and a 1,3-diene which bears an identical functional group at each of its ends. It has the advantage of having both the macrostructure characteristics of a polymer obtained by anionic polymerization and the microstructure characteristics of a polymer obtained by catalytic polymerization.

Thus, the invention relates to a telechelic polymer of formula (I)

$$Z_1\text{-POLY-}Z_2 \quad (I)$$

in which the term "POLY" denotes a polymer chain comprising units of a 1,3-diene, ethylene units and cyclic units, 1,2-cyclohexane units of formula (II)

(II)

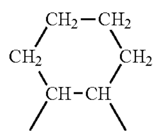

$Z_1$ and $Z_2$ denoting a group containing a function, $Z_1$ and $Z_2$ being identical, which polymer has a macrostructure defined by a dispersity of less than 1.5 or by a number-average molar mass of greater than 10 000 g/mol.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b).

The term "based on" used to define the constituents of a catalytic system or of a composition means the mixture of these constituents, or the product of the reaction of a portion or all of these constituents with each other.

Unless otherwise indicated, the contents of the units resulting from the insertion of a monomer into a copolymer are expressed as a molar percentage relative to the total monomer units that constitute the polymer.

The compounds mentioned in the description may be of fossil origin or may be biobased. In the latter case, they may be partially or totally derived from biomass or may be obtained from renewable starting materials derived from biomass. Similarly, the compounds mentioned may also be derived from the recycling of already-used materials, i.e. they may be partly or totally derived from a recycling process, or obtained from raw materials which are themselves derived from a recycling process.

The polymer according to the invention has the essential characteristic of comprising a polymer chain, called POLY, which comprises ethylene units. In a known manner, an ethylene unit is a unit which has the $-(CH_2-CH_2)-$ unit. Preferentially, the polymer chain contains more than 50 mol % of ethylene units.

The polymer chain contains units of a 1,3-diene. In a known manner, a 1,3-diene may be inserted into a growing polymer chain by a 1,4 or 2,1 insertion or 3,4 insertion in the case of substituted diene such as isoprene to give rise to the formation of the 1,3-diene unit of 1,4 configuration, the 1,3-diene unit of 1,2 configuration or of 3,4 configuration, respectively. Preferably, the 1,3-diene units in the 1,2-configuration and the 1,3-diene units in the 3,4-configuration represent more than 50 mol % of the 1,3-diene units.

According to the invention, the 1,3-diene whose monomer units constitute the POLY polymer chain is a single compound, i.e. a single 1,3-diene, or is a mixture of 1,3-dienes which differ from each other in chemical structure. Any catalytically polymerizable 1,3-diene may be suitable for use. For example, 1,3-dienes containing 4 to 20 carbon atoms may be mentioned. The 1,3-diene is preferably 1,3-butadiene or a mixture of 1,3-dienes, one of which is 1,3-butadiene.

According to the invention, the polymer chain contains 6-membered ring units corresponding to formula (II)

(II)

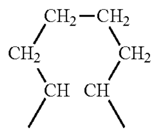

The presence of these ring structures in the polymer chain results from a very particular insertion of ethylene and 1,3-butadiene during their copolymerization, as described, for example, in Macromolecules 2009, 42, 3774-3779. Preferably, the polymer chain contains not more than 15 mol % of 1,2-cyclohexane units. The content of 1,2-cyclohexane units in the polymer chain varies according to the respective contents of ethylene and 1,3-butadiene in the polymer chain. The polymer chain generally contains less than 10 mol % of 1,2-cyclohexane units for the highest contents of ethylene in the polymer and may contain more than 10% for the lowest contents of ethylene in the polymer, for example up to 15%.

According to a first variant of the invention, the polymer chain called "POLY" is a copolymer chain of 1,3-diene and ethylene. In other words, the monomer units of the polymer chain represented by the name "POLY" are units resulting from the copolymerization of ethylene and 1,3-diene.

According to a second variant of the invention, the polymer chain called "POLY" is a terpolymer chain of 1,3-diene, ethylene and an α-monoolefin. The term "α-monoolefin" means an α-olefin which contains a single carbon-carbon double bond, the double bonds in aromatic compounds not being taken into account. For example, styrene is considered an α-monoolefin. In the second variant, the polymer chain represented by the name "POLY" contains a termonomer, a monomer other than ethylene and 1,3-diene, and the monomer units of the polymer chain represented by the name "POLY" are units resulting from the terpolymerization of ethylene, the 1,3-diene and the α-monoolefin. The termonomer is an α-monoolefin, preferably an aromatic α-monoolefin. As aromatic α-monoolefins, mention may be made of monoolefins substituted alpha to the double bond with a substituted or unsubstituted phenyl group, such as styrene, styrenes substituted with one or more para, meta or ortho alkyl groups or mixtures thereof. The termonomer is advantageously styrene.

Preferably, the polymer chain is a statistical copolymer chain, in which case the name POLY represents a polymer chain in which the monomer units are statistically distributed, due to a statistical incorporation of the monomers into the growing polymer chain.

The functional groups represented by the symbols $Z_1$ and $Z_2$ are groups containing a function. They have the essential characteristic of being identical. Each of the functional groups represented by $Z_1$ and $Z_2$, respectively, also has the essential characteristic of sharing a covalent bond with one of the carbon atoms of the monomer unit at the chain end. Functional groups that may be mentioned include alcohol, amine, halogen, carbonyl such as ester, alkoxysilane and silanol functions. The functional group preferentially contains an alcohol, amine, halogen, carbonyl such as ester, alkoxysilane or silanol function.

The telechelic polymer according to the invention also has the essential characteristic of having a particular macrostructure, since it has at least one of the following characteristics, which are a dispersity of less than 1.5 and a number-average molar mass greater than 10 000 g/mol. In a known manner, the dispersity is the ratio between the mass-average molar mass of the polymer (conventionally noted Mw) and the number-average molar mass (conventionally noted Mn) of the polymer.

According to one variant, the macrostructure is defined by a number-average molar mass of greater than 10 000 g/mol, preferentially greater than 20 000 g/mol. According to this variant, the macrostructure is preferentially defined by both a number-average molar mass of greater than 10 000 g/mol and a dispersity of less than 1.5, more preferentially by a number-average molar mass of greater than 20 000 g/mol and a dispersity of less than 1.5.

According to another variant, the macrostructure is defined by a dispersity of less than 1.5. According to this variant, the number-average molar masses may vary to a large extent; in particular, they may be less than 10 000 g/mol.

The telechelic polymer according to the invention may be synthesized via a catalytic polymerization process in the presence of a catalytic system based on at least one metallocene and a co-catalyst. The term "based on" used to define the constituents of the catalytic system means the mixture of these constituents, or the product of the reaction of a portion or all of these constituents with each other.

In the present patent application, the term "metallocene" means an organometallic complex, the metal of which, in the case in point the rare-earth metal atom, is bonded to two groups $Cp^3$ and $Cp^4$ or to a ligand molecule consisting of two groups $Cp^1$ and $Cp^2$ connected together by a bridge P. These groups $Cp^1$, $Cp^2$, $Cp^3$ and $Cp^4$, which are identical or different, are chosen from the group consisting of fluorenyl groups, cyclopentadienyl groups and indenyl groups, these groups possibly being substituted or unsubstituted. It is recalled that rare-earth elements are metals and denote the elements scandium, yttrium and the lanthanides, the atomic number of which ranges from 57 to 71.

According to a first variant of the invention, the metallocene used as base constituent in the catalytic system corresponds to formula (IIIa)

$$\{P(Cp^1)(Cp^2)Y\} \qquad \text{(IIIa)}$$

in which

Y denotes a group including a metal atom which is a rare-earth metal, $Cp^1$ and $Cp^2$, which are identical or different, are chosen from the group consisting of fluorenyl groups, cyclopentadienyl groups and indenyl groups, the groups being substituted or unsubstituted, P is a group bridging the two groups $Cp^1$ and $Cp^2$ and comprising a silicon or carbon atom.

According to a second variant of the invention, the metallocene used as base constituent in the catalytic system in accordance with the invention corresponds to formula (IIIb)

$$Cp^3Cp^4Y \qquad \text{(IIIb)}$$

in which

Y denotes a group including a metal atom which is a rare-earth metal, $Cp^3$ and $Cp^4$, which are identical or different, are chosen from the group consisting of fluorenyl groups, cyclopentadienyl groups and indenyl groups, the groups being substituted or unsubstituted.

As substituted cyclopentadienyl, fluorenyl and indenyl groups, mention may be made of those substituted with alkyl radicals containing from 1 to 6 carbon atoms or with aryl radicals containing from 6 to 12 carbon atoms or else with trialkylsilyl radicals, such as $SiMe_3$. The choice of the radicals is also guided by the accessibility to the corresponding molecules, which are the substituted cyclopentadienes, fluorenes and indenes, since said molecules are commercially available or can be readily synthesized.

As substituted fluorenyl groups, mention may be made of those substituted in position 2, 7, 3 or 6, particularly 2,7-di(tert-butyl)fluorenyl and 3,6-di(tert-butyl)fluorenyl. The 2, 3, 6 and 7 positions respectively denote the position of the carbon atoms of the rings as represented in the diagram below, the 9 position corresponding to the carbon atom to which the bridge P is attached.

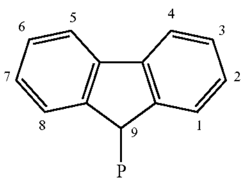

As substituted cyclopentadienyl groups, mention may be made particularly of those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

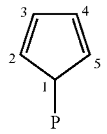

As substituted indenyl groups, mention may be made particularly of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

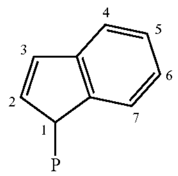

Preferably, the metallocene is of formula (IIIa).

Preferably, $Cp^1$ and $Cp^2$ are identical and are chosen from the group consisting of substituted fluorenyl groups and the unsubstituted fluorenyl group of formula $C_{13}H_8$. Advantageously, $Cp^1$ and $Cp^2$ are identical and each represent an unsubstituted fluorenyl group of formula $C_{13}H_8$, represented by the symbol Flu.

Preferably, the symbol Y represents the group Met-G, with Met denoting a metal atom which is a rare-earth metal and G denoting a group comprising the borohydride $BH_4$ unit or denoting a halogen atom chosen from the group consisting of chlorine, fluorine, bromine and iodine.

Advantageously, G denotes a chlorine atom or the group of formula (IIIc):

$$(BH_4)_{(1+y)}\text{-}L_y\text{-}N_x \qquad \text{(IIIc)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

Very advantageously, G denotes the group of formula (IIIc).

Any ether which has the ability to complex the alkali metal, notably diethyl ether and tetrahydrofuran, is suitable as ether.

The metal of the metallocene is preferably a lanthanide, the atomic number of which ranges from 57 to 71, more preferentially neodymium, Nd.

The bridge P connecting the groups $Cp^1$ and $Cp^2$ preferably corresponds to the formula $ZR^1R^2$, in which Z represents a silicon or carbon atom and $R^1$ and $R^2$, which are identical or different, each represent an alkyl group comprising from 1 to 20 carbon atoms, preferably a methyl. In the formula $ZR^1R^2$, Z advantageously represents a silicon atom, Si.

The metallocene that is useful for the synthesis of the catalytic system may be in the form of a crystalline or non-crystalline powder, or else in the form of single crystals. The metallocene may be in a monomer or dimer form, these forms depending on the method of preparation of the metallocene, as is described, for example, in patent application WO 2007/054224 or WO 2007/054223. The metallocene may be prepared conventionally by a process analogous to that described in patent application WO 2007/054224 or WO 2007/054223, notably by reaction, under inert and anhydrous conditions, of the salt of an alkali metal of the ligand with a rare-earth metal borohydride in a suitable solvent, such as an ether, for instance diethyl ether or tetrahydrofuran, or any other solvent known to those skilled in the art. After reaction, the metallocene is separated from the reaction by-products via techniques known to those skilled in the art, such as filtration or precipitation from a second solvent. The metallocene is finally dried and isolated in solid form.

According to a particularly preferential embodiment, the metallocene is of formula (III-1), (III-2), (III-3), (III-4) or (III-5):

$$[Me_2Si(Flu)_2Nd(\mu\text{-}BH_4)_2Li(THF)] \quad \text{(III-1)}$$

$$[\{Me_2SiFlu_2Nd(\mu\text{-}BH_4)_2Li(THF)\}_2] \quad \text{(III-2)}$$

$$[Me_2SiFlu_2Nd(\mu\text{-}BH_4)(THF)] \quad \text{(III-3)}$$

$$[\{Me_2SiFlu_2Nd(\mu\text{-}BH_4)(THF)\}_2] \quad \text{(III-4)}$$

$$[Me_2SiFlu_2Nd(\mu\text{-}BH_4)] \quad \text{(III-5)}$$

in which Flu represents the $C_{13}H_8$ group.

Another basic component of the catalytic system is the co-catalyst, an organomagnesium reagent of formula (IV) or formula (V).

$$R^B\text{—}(Mg\text{—}R^A)_n\text{—}Mg\text{—}R^B \quad \text{(IV)}$$

$$X\text{—}Mg\text{—}R^C\text{—}Mg\text{—}X \quad \text{(V)}$$

$R^A$ being a divalent aliphatic hydrocarbon-based chain, interrupted or not with one or more oxygen or sulfur atoms or with one or more arylene groups, $R^B$ comprising a benzene nucleus substituted with the magnesium atom, one of the carbon atoms of the benzene nucleus ortho to the magnesium being substituted with a methyl, an ethyl or an isopropyl or forming a ring with the carbon atom which is its closest neighbour and which is meta to the magnesium, the other carbon atom of the benzene nucleus ortho to the magnesium being substituted with a methyl, an ethyl or an isopropyl, n being a number greater than or equal to 1 and preferably equal to 1.

$R^C$ being a divalent aliphatic hydrocarbon-based chain, interrupted or not with one or more oxygen or sulfur atoms or with one or more arylene groups, X being a halogen atom.

The co-catalysts of formula (IV) and (V) both have the particular feature of including two magnesium-carbon bonds involving different magnesium atoms. In formula (IV), two magnesium atoms each share a first bond with a first carbon atom of $R^B$ and a second bond with a second carbon atom of $R^A$. The first carbon atom is a constituent of the benzene nucleus of $R^B$. The second carbon atom is a constituent of the aliphatic hydrocarbon-based chain $R^A$ which may contain within its chain one or more heteroatoms chosen from oxygen and sulfur or one or more arylene groups. In the preferential case where n is equal to 1, each magnesium atom thus shares a first bond with a first carbon atom of $R^B$ and a second bond with a second carbon atom of $R^A$. In formula (V), each magnesium atom thus shares a first bond with a halogen atom and a second bond with a carbon atom of $R^C$.

In formula (IV), $R^B$ has the characteristic feature of comprising a benzene nucleus substituted with the magnesium atom. The two carbon atoms of the benzene nucleus of $R^B$ ortho to the magnesium bear an identical or different substituent. Alternatively, one of the two carbon atoms of the benzene nucleus of $R^B$ ortho to the magnesium may bear a substituent, and the other carbon atom of the benzene nucleus of $R^B$ ortho to the magnesium may form a ring. The substituent is a methyl, an ethyl or an isopropyl. In the case where one of the two carbon atoms of the benzene nucleus of $R^B$ ortho to the magnesium is substituted with an isopropyl, the second carbon atom of the benzene nucleus of $R^B$ ortho to the magnesium is preferably not substituted with an isopropyl. Preferably, the carbon atoms of the benzene nucleus of $R^B$ ortho to the magnesium are substituted with a methyl or an ethyl. More preferentially, the carbon atoms of the benzene nucleus of $R^B$ ortho to the magnesium are substituted with a methyl.

The organomagnesium compound of formula (IV) preferentially corresponds to formula (IVa-n) in which n is greater than or equal to 1, $R_1$ and $R_5$, which are identical or different, represent a methyl or an ethyl, preferably a methyl, $R_2$, $R_3$ and $R_4$, which are identical or different, represent a hydrogen atom or an alkyl and $R^A$ is a divalent aliphatic hydrocarbon-based chain, interrupted or not with one or more oxygen or sulfur atoms or with one or more arylene groups. Preferably, $R_1$ and $R_5$ represent a methyl. Preferably, $R_2$ and $R_4$ represent a hydrogen atom.

(IVa-n)

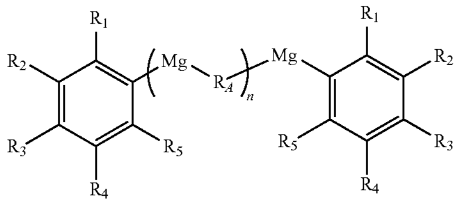

The organomagnesium compound of formula (IVa-n) is of formula (IVa-1) in the case where n is equal to 1.

(IVa-1)

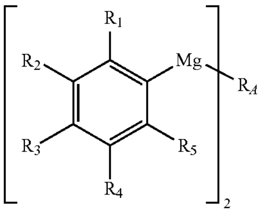

According to a preferential variant, $R_1$, $R_3$ and $R_5$ are identical in formula (IVa-n), notably in formula (IVa-1). According to a more preferential variant, $R_2$ and $R_4$ represent a hydrogen and $R_1$, $R_3$ and $R_5$ are identical. In a more preferential variant, $R_2$ and $R_4$ represent a hydrogen and $R_1$, $R_3$ and $R_5$ represent a methyl.

In formulae (IV) and (IVa-n), in particular in formula (IVa-1), $R^A$ is a divalent aliphatic hydrocarbon-based chain which may contain within its chain one or more heteroatoms chosen from oxygen and sulfur or one or more arylene groups. Preferably, $R^A$ is a branched or linear alkanediyl, cycloalkanediyl or xylenediyl radical. More preferentially, $R^A$ is an alkanediyl.

Preferably, $R^A$ contains 3 to 10 carbon atoms, in particular 3 to 8 carbon atoms.

Even more preferentially, $R^A$ is an alkanediyl containing 3 to 10 carbon atoms.

Advantageously, $R^A$ is an alkanediyl containing 3 to 8 carbon atoms. Very advantageously, $R^A$ is a linear alkanediyl. 1,3-propanediyl, 1,4-butanediyl, 1,5-pentanediyl, 1,6-hexanediyl, 1,7-heptanediyl and 1,8-octanediyl are most particularly suitable as groups $R^A$.

According to any one of the embodiments of the invention, n is preferentially equal to 1 in formula (IV), in particular in formula (IVa-n).

The organomagnesium compound of formula (IV) may be prepared via a process which comprises the reaction of a first organomagnesium reagent of formula X'Mg-$R^A$—MgX' with a second organomagnesium reagent of formula $R^B$—Mg—X', in which X' represents a halogen atom, preferentially bromine or chlorine, $R^B$ and $R^A$ being as defined previously. X' is more preferentially a bromine atom. The stoichiometry used in the reaction determines the value of n in formula (IV) and in formula (IVa). For example, a mole ratio of 0.5 between the amount of the first organomagnesium reagent and the amount of the second organomagnesium reagent is favourable to the formation of an organomagnesium compound of formula (IV) in which n is equal to 1, whereas a mole ratio of greater than 0.5 will be more favourable to the formation of an organomagnesium compound of formula (IV) in which n is greater than 1.

To perform the reaction of the first organomagnesium reagent with the second organomagnesium reagent, a solution of the second organomagnesium reagent is typically added to a solution of the first organomagnesium reagent. The solutions of the first organomagnesium reagent and the second organomagnesium reagent are generally solutions in an ether, such as diethyl ether, dibutyl ether, tetrahydrofuran, methyltetrahydrofuran, or a mixture of two or more of these ethers. Preferably, the respective concentrations of the solutions of the first organomagnesium reagent and the second organomagnesium reagent are from 0.01 to 3 mol/L and from 0.02 to 5 mol/L, respectively. More preferentially, the respective concentrations of the first organomagnesium reagent and the second organomagnesium reagent are from 0.1 to 2 mol/L and from 0.2 to 4 mol/L, respectively.

The first organomagnesium reagent and the second organomagnesium reagent may be prepared beforehand by a Grignard reaction from magnesium metal and a suitable precursor. For the first organomagnesium reagent and the second organomagnesium reagent, the respective precursors are of formula X'—$R^A$—X' and $R^B$—X', $R^A$, $R^B$ and X' being as defined previously. The Grignard reaction is typically performed by adding the precursor to magnesium metal which is generally in the form of chips. Preferably, iodine ($I_2$) typically in the form of beads is introduced into the reactor prior to the addition of the precursor to activate the Grignard reaction in a known manner.

Alternatively, the organomagnesium compound in accordance with the invention may be prepared by reacting an organometallic compound of formula M-$R^A$-M and the organomagnesium reagent of formula $R^B$—Mg—X', where M represents a lithium, sodium or potassium atom, X', $R^B$ and $R^A$ being as defined previously. Preferably, M represents a lithium atom, in which case the organometallic compound of formula M-$R^A$-M is an organolithium reagent.

The reaction of the organolithium reagent and of the organomagnesium reagent is typically performed in an ether such as diethyl ether, dibutyl ether, tetrahydrofuran or methyltetrahydrofuran. The reaction is also typically performed at a temperature ranging from 0° C. to 60° C. The placing in contact is preferably performed at a temperature of between 0° C. and 23° C. The placing in contact of the organometallic compound of formula M-$R^A$-M with the organomagnesium reagent of formula $R^B$—Mg—X' is preferentially performed by adding a solution of the organometallic compound M-$R^A$-M to a solution of the organomagnesium reagent $R^B$—Mg—X'. The solution of the organometallic compound M-$R^A$-M is generally a solution in a hydrocarbon-based solvent, preferably n-hexane, cyclohexane or methylcyclohexane, and the solution of the organomagnesium reagent $R^B$—Mg—X' is generally a solution in an ether, preferably diethyl ether or dibutyl ether. Preferably, the respective concentrations of the solutions of the organometallic compound and of the organomagnesium reagent M-$R^A$-M and $R^B$—Mg—X' are from 0.01 to 1 mol/L and from 1 to 5 mol/L, respectively. More preferentially, the respective concentrations of the solutions of the organometallic compound and of the organomagnesium reagent M-$R^A$-M and $R^B$—Mg—X' are from 0.05 to 0.2 mol/L and from 2 to 3 mol/L, respectively.

As with any synthesis performed in the presence of organometallic compounds, the syntheses described for the synthesis of the organomagnesium reagents take place under anhydrous conditions under an inert atmosphere, in stirred reactors. Typically, the solvents and the solutions are used under anhydrous nitrogen or argon.

Once the organomagnesium reagent of formula (IV) has been formed, it is generally recovered in solution after filtration performed under an inert anhydrous atmosphere. It may be stored prior to use in its solution in sealed containers, for example capped bottles, at a temperature of between −25° C. and 23° C.

Like any organomagnesium compound, the organomagnesium compound of formula (IV) may be in the form of a monomeric species $(R^B—(Mg—R^A)_n—Mg—R^B)_1$ or in the form of a polymeric species $(R^B—(Mg—R^A)_n—Mg—R^B)_p$, where p is an integer greater than 1, notably dimer $(R^B—(Mg—R^A)_n—Mg—R^B)_2$, where n is as defined previously. Moreover, whether it is in the form of a monomer or polymer species, it may also be in the form of a species coordinated to one or more molecules of a solvent, preferably of an ether such as diethyl ether, tetrahydrofuran or methyltetrahydrofuran.

In formula (V), $R^C$ is a divalent aliphatic hydrocarbon-based chain which may contain within its chain one or more heteroatoms chosen from oxygen and sulfur or one or more arylene groups. Preferably, $R^C$ is a branched or linear alkanediyl, cycloalkanediyl or xylenediyl radical. More preferentially, $R^C$ is an alkanediyl.

Preferably, $R^C$ contains 3 to 10 carbon atoms, in particular 3 to 8 carbon atoms.

Even more preferentially, $R^C$ is an alkanediyl containing 3 to 10 carbon atoms. Advantageously, $R^C$ is an alkanediyl containing 3 to 8 carbon atoms. Very advantageously, $R^C$ is a linear alkanediyl. 1,3-propanediyl, 1,4-butanediyl, 1,5-pentanediyl, 1,6-hexanediyl, 1,7-heptanediyl and 1,8-octanediyl are most particularly suitable as groups $R^C$.

The compounds of formula (V) are well known as Grignard reagents. However, they are not known to be used as co-catalysts in a catalytic system for use in the preparation of polyolefins. Grignard reagents of formula (V) are described, for example, in the book "Advanced Organic Chemistry" by J. March, 4th Edition, 1992, pages 622-623 or in the book "Handbook of Grignard Reagents", Edition Gary S. Silverman, Philip E. Rakita, 1996, pages 502-503. They may be synthesized by placing magnesium metal in contact with a dihalogen compound of formula X—$R^C$—X, $R^C$ being as defined according to the invention. For their synthesis, reference may be made, for example, to the collection of volumes of "Organic Synthesis".

Like any organomagnesium compound, the organomagnesium reagent of formula (V) may be in the form of a monomer species $(X—Mg—R^C—Mg—X)_1$ or in the form of a polymer species $(X—Mg—R^C—Mg—X)_p$, p being an integer greater than 1, notably a dimer $(X—Mg—R^C—Mg—X)_2$. Moreover, whether it is in the form of a monomer or polymer species, it may also be in the form of a species coordinated to one or more molecules of a solvent, preferably of an ether such as diethyl ether, tetrahydrofuran or methyltetrahydrofuran. In formula (V), X is preferentially a bromine or chlorine atom, more preferentially a bromine atom.

The catalytic system may be prepared conventionally via a process analogous to that described in patent application WO 2007/054224 or WO 2007/054223. For example, the co-catalyst, in this case the organomagnesium reagent of formula (IV) or of formula (V), and the metallocene are reacted in a hydrocarbon-based solvent typically at a temperature ranging from 20° C. to 80° C. for a time of between 5 and 60 minutes. The amounts of co-catalyst and of metallocene reacted are such that the ratio between the number of moles of Mg of the co-catalyst and the number of moles of rare-earth metal of the metallocene is preferably from 1 to 200 and more preferentially from 1 to less than 20. The range of values extending from 1 to less than 20 is notably more favourable for obtaining polymers of high molar masses. The catalytic system is generally prepared in an aliphatic hydrocarbon-based solvent such as methylcyclohexane, or an aromatic hydrocarbon-based solvent such as toluene. Generally, after its synthesis, the catalytic system is used as is in the process for the synthesis of the polymer in accordance with the invention.

Alternatively, the catalytic system may be prepared via a process analogous to that described in patent application WO 2017/093654 A1 or in patent application WO 2018/020122 A1. According to this alternative, the catalytic system also contains a preformation monomer chosen from a conjugated diene, ethylene or a mixture of ethylene and a conjugated diene, in which case the catalytic system is based at least on the metallocene, the co-catalyst and the preformation monomer. For example, the organomagnesium reagent and the metallocene are reacted in a hydrocarbon-based solvent typically at a temperature of from 20° C. to 80° C. for 10 to 20 minutes to obtain a first reaction product, and the preformation monomer, chosen from a conjugated diene, ethylene or a mixture of ethylene and a conjugated diene, is then reacted with this first reaction product at a temperature ranging from 40° C. to 90° C. for 1 hour to 12 hours. The conjugated diene, as preformation monomer, is preferably a 1,3-diene such as 1,3-butadiene, isoprene or a 1,3-diene of formula $CH_2{=}CR—CH{=}CH_2$, the symbol R representing a hydrocarbon chain containing 3 to 20 carbon atoms, in particular myrcene or β-farnesene. The catalytic system thus obtained may be used directly in the process for synthesizing the polymer in accordance with the invention or may be stored under an inert atmosphere, notably at a temperature ranging from −20° C. to room temperature (23° C.), before being used in the synthesis of polymers.

Like any synthesis performed in the presence of an organometallic compound, the synthesis of the metallocene, the synthesis of the organomagnesium reagent and the synthesis of the catalytic system take place under anhydrous conditions under an inert atmosphere. Typically, the reactions are performed starting with anhydrous solvents and compounds under anhydrous nitrogen or argon.

The catalytic system may be in the form of a solution when it is in the presence of a hydrocarbon-based solvent. The hydrocarbon-based solvent may be aliphatic, such as methylcyclohexane, or aromatic, such as toluene. The hydrocarbon-based solvent is preferably aliphatic, more preferentially methylcyclohexane. Generally, the catalytic system is stored in the form of a solution in the hydrocarbon-based solvent before being used in polymerization. This may then be referred to as a catalytic solution which comprises the catalytic system and the hydrocarbon-based solvent. The catalytic system preferably comprises a hydrocarbon-based solvent. When the catalytic system is in solution, its concentration is defined by the content of metallocene metal in the solution. The concentration of metallocene metal has a value preferentially ranging from 0.0001 to 0.2 mol/L, more preferentially from 0.001 to 0.03 mol/L.

The polymerization is preferably performed in solution, continuously or batchwise. The polymerization solvent may be an aromatic or aliphatic hydrocarbon-based solvent. Examples of polymerization solvents that may be mentioned include toluene and methylcyclohexane. The monomers may be introduced into the reactor containing the polymerization solvent and the catalytic system or, conversely, the catalytic system may be introduced into the reactor containing the polymerization solvent and the monomers. The monomers and the catalytic system may be introduced simultaneously into the reactor containing the polymerization solvent, notably in the case of a continuous polymerization. The polymerization is typically performed under anhydrous conditions and in the absence of oxygen, in the optional presence of an inert gas. The polymerization temperature generally varies within a range extending from 25 to 120° C., preferentially from 30 to 100° C. It is adjusted according to the monomers to be polymerized. Preferably, the copolymerization is performed at a constant pressure of ethylene.

During the polymerization of ethylene and of 1,3-dienes in a polymerization reactor, ethylene and 1,3-dienes may be added continuously to the polymerization reactor, in which case the polymerization reactor is a fed reactor. This embodiment is most particularly suitable for the synthesis of statistical copolymers.

The polymerization step allows the preparation of a polymer which has the particular feature of having a carbon-magnesium bond at each of its ends. It is followed by a functionalization step with a modifying agent to lead to the synthesis of the telechelic polymer in accordance with the invention. The modifying agent is typically a compound known to react with a compound containing a carbon-magnesium bond. Modifying agents that are particularly suitable for use are tertiary amines, protected amines, dihalogens, ketones, esters and alkoxysilanes. The modifying agent is typically added to the polymerization medium. The functionalized polymer can be recovered according to conventional techniques known to those skilled in the art, for instance by precipitation, by evaporation of the solvent under reduced pressure or by steam stripping.

When the telechelic polymer in accordance with the invention is synthesized according to the process described previously, it contains within its polymer chain the divalent radical $R^A$ or $R^C$ which respectively constitute the co-catalysts of formulae (IV) and (V). The presence in the polymer chain of the divalent radical originating from the co-catalyst results from the mechanism of the polymerization reaction which involves chain-transfer reactions between the metal of the metallocene and the carbon-magnesium bonds of the co-catalyst. Thus, according to one embodiment of the invention, the telechelic polymer contains within the polymer chain, represented by the name "POLY" in formula (I), a divalent group R which has the same chemical structure as that of the divalent radicals $R^A$ and $R^C$ defined previously, including in the preferential embodiments.

In summary, the invention is advantageously performed according to any one of the following embodiments 1 to 17:

Embodiment 1: Telechelic polymer of formula (I)

$$Z_1\text{-POLY-}Z_2 \qquad (I)$$

in which the term "POLY" denotes a polymer chain comprising units of a 1,3-diene, ethylene units and cyclic units, 1,2-cyclohexane units of formula (II), (II)

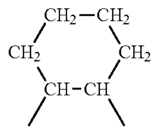

$Z_1$ and $Z_2$ denoting a group containing a function, $Z_1$ and $Z_2$ being identical, which polymer has a macrostructure defined by a dispersity of less than 1.5 or by a number-average molar mass of greater than 10 000 g/mol.

Embodiment 2: Telechelic polymer according to embodiment 1, in which the polymer chain is a copolymer chain of 1,3-diene and ethylene or a terpolymer chain of 1,3-diene, ethylene and an α-monoolefin.

Embodiment 3: Telechelic polymer according to embodiment 2, in which the α-monoolefin is styrene.

Embodiment 4: Telechelic polymer according to any one of embodiments 1 to 3, in which the 1,3-diene is 1,3-butadiene or a mixture of 1,3-dienes, one of which is 1,3-butadiene.

Embodiment 5: Telechelic polymer according to any one of embodiments 1 to 4, in which the polymer chain contains more than 50 mol % of ethylene units.

Embodiment 6: Telechelic polymer according to any one of embodiments 1 to 5, in which the polymer chain contains not more than 15 mol % of 1,2-cyclohexane units of formula (II).

(II)

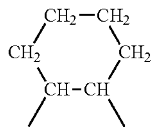

Embodiment 7: Telechelic polymer according to any one of embodiments 1 to 6, in which the polymer chain is a statistical copolymer chain.

Embodiment 8: Telechelic polymer according to any one of embodiments 1 to 7, in which $Z_1$ and $Z_2$ denote a group comprising an alcohol, amine, halogen, carbonyl, alkoxysilane or silanol function.

Embodiment 9: Telechelic polymer according to any one of embodiments 1 to 8, in which the macrostructure is defined by a number-average molar mass of greater than 10 000 g/mol, preferentially greater than 20 000 g/mol.

Embodiment 10: Telechelic polymer according to embodiment 9, in which the macrostructure is defined by a dispersity of less than 1.5.

Embodiment 11: Telechelic polymer according to any one of embodiments 1 to 10, which polymer contains within the polymer chain "POLY" a divalent group R, an aliphatic hydrocarbon-based chain, interrupted or not with one or more oxygen or sulfur atoms or one or more arylene groups, R being other than an ethylene unit, a 1,3-diene unit, a chain of ethylene units, a chain of 1,3-diene units, a chain of units consisting of one or more ethylene units and one or more 1,3-diene units.

Embodiment 12: Telechelic polymer according to embodiment 11, in which the divalent group R is a branched or linear alkanediyl, a cycloalkanediyl or a xylenediyl radical.

Embodiment 13: Telechelic polymer according to embodiment 11 to 12, in which the divalent group contains 3 to 10 carbon atoms.

Embodiment 14: Telechelic polymer according to any one of embodiments 11 to 13, in which the divalent group R contains from 3 to 8 carbon atoms.

Embodiment 15: Telechelic polymer according to any one of embodiments 11 to 14, in which the divalent group R is an alkanediyl.

Embodiment 16: Telechelic polymer according to any one of embodiments 11 to 15, in which the divalent group R is a linear alkanediyl.

Embodiment 17: Telechelic polymer according to any one of embodiments 11 to 16, in which the divalent group R is 1,3-propanediyl, 1,5-pentanediyl or 1,7-heptanediyl.

The abovementioned features of the present invention, and also others, will be understood more clearly on reading the following description of implementation examples of the invention, which are given as non-limiting illustrations.

EXAMPLES

Example 1: Preparation of a Co-Catalyst Containing Two Magnesium-Carbon Bonds Involving Different Magnesium Atoms, 1,5-Di(Magnesium Bromide)Pentanediyl (DMBP)

9.72 g of magnesium (400 mmol, 10 equivalents), 80 mL of 2-methyltetrahydrofuran (MeTHF) (of which 64 mL in the dropping funnel), 60 mg of diiodine (0.23 mmol, 0.006 equivalent) and 5.45 mL of 1,5-dibromopentane (40 mmol, 1 equivalent) were used in the synthesis. The glassware used consisted of a 200 mL flask and a 100 mL dropping funnel. Once the synthesis of the Grignard reagent is complete, the solution is transferred through the filter cannula into a second inertized 200 mL flask. This solution is concentrated under vacuum and then diluted in 55 mL of toluene. The concentration of pentanediyl group is estimated at 0.43 mol $L^{-1}$. This oil is immiscible in methylcyclohexane.

Aliquot of the concentrated oil: $^1H$ NMR (Toluene-$D_8$—500 MHz—298 K) δ: ppm=2.21 (quint, J=7.2 Hz, "b"), 1.88 (quint, J=7.0 Hz, "c"), 0.11 (t, J=7.4 Hz, "a"); quint for quintet.

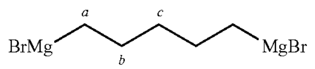

Example 2: Synthesis of 2-mesitylmagnesium Bromide 4.15 g (170 mmol, 3.4 equivalents) of magnesium are inertized in a 250 mL flask fitted with a magnetized olive and mounted with a 10 mL dropping funnel. A diiodine bead (10 mg) is added to the magnesium. 47.5 mL of MeTHF are placed in the flask with stirring and 2.5 mL are placed in the dropping funnel. 7.65 mL of degassed 2-bromomesitylene (50 mmol, 1 equivalent) dried over activated molecular sieves are placed in the dropping funnel. The flask is heated to 60° C. and the 2-bromomesitylene is added dropwise to the magnesium over 1 hour. Stirring is continued for 3 h at 60° C. and then for 12 h at 20° C.

Aliquot of the concentrated oil in a Young's tube: $^1H$ NMR ($C_6D_6$—400 MHz—298 K) δ: ppm=7.01 (s, "a"), 2.74 (s, "b"), 2.36 (s, "c")

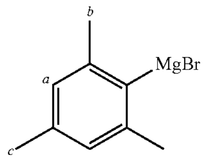

Synthesis of Telechelic Polymers

Ethylene and butadiene copolymers were prepared from the complex $\{(Me_2Si(C_{13}H_8)_2)Nd(—BH_4)[(—BH_4)Li(THF)]\}_2$ and the co-catalyst 1,5-di(magnesium bromide) pentanediyl (DMBP) prepared according to the procedure described above in Example 1. The polymers were characterized using the methods described hereinbelow.

THF size exclusion chromatography (THF-SEC). The size exclusion chromatography analyses were performed with a Viscotek TDA305 machine (Malvern Instruments). This machine is equipped with three columns (SDVB (styrene-divinylbenzene column), 5 μm, 300×7.5 mm from Polymer Standard Service), a guard column and three detectors (differential refractometer and viscometer, and light scattering).

The polymer to be analysed is dissolved in THF (elution solvent) at a concentration of 3 mg $mL^{-1}$ to prepare a solution of the sample. 3 mL of a solution of the sample with a concentration of 3 mg $mL^{-1}$ in THF are filtered through a 0.45 μm PTFE membrane. 100 μL of this solution are eluted in THF using a flow rate of 1 mL $min^{-1}$ at a temperature of 35° C. OmniSEC software is used for data acquisition and analysis. The number-average molar mass and mass-average molar mass of the synthesized polymers are determined by "Moore" calibration using a universal calibration curve calibrated from standard polystyrenes (peak molar mass $M_p$: 1306 to 2 520 000 g $mol^{-1}$) from Polymer Standard Service (Mainz). The dispersity is calculated by dividing the mass-average molar mass (Mw) by the number-average molar mass (Mn).

Nuclear magnetic resonance (NMR). High resolution NMR spectroscopy of the polymers was performed on a Bruker 400 Avance III spectrometer operating at 400 MHz equipped with a 5 mm BBFO probe for the proton and on a Bruker 400 Avance II spectrometer operating at 400 MHz equipped with a 10 mm PSEX $^{13}C$ probe for the carbon. Acquisitions were made at 363 K. A mixture of tetrachloroethylene (TCE) and deuterated benzene ($C_6D_6$) (2/1 v/v) was used as solvent. The samples were analysed at a concentration of 1% by mass for proton and 5% by mass for carbon. The chemical shifts are given in ppm, relative to the deuterated benzene proton signal set at 7.16 ppm and the TCE carbon signal set at 120.65 ppm. The sequence used to acquire a $^{13}C$ spectrum of a polymer is: "Power gate decoupling" (NOE proton-decoupled spectrum) with a pulse angle of 70°, DT=64 K and a delay between pulses of 4.5 s. The number of acquisitions is set at 5120.

Example EBR-A 310 mL of toluene purified on an activated alumina column (also known as a solvent fountain) are placed in a 750 mL Steinie bottle. After sparging with nitrogen for about 10 minutes, 300 mL of toluene are thus recovered. 46 mg (72 μmol of neodymium) of $\{(Me_2Si(C_{13}H_8)_2)Nd(—BH_4)[(—BH_4)Li(THF)]\}_2$ complex are weighed out in a 250 mL Steinie bottle in a glove box. About 100 mL of the contents of the 750 mL bottle are transferred into the 250 mL bottle by a double-headed needle system. 2.3 mL of 1,5-di(magnesium bromide)pentanediyl (DMBP) prepared according to the same method as described in Example 1 (0.43 mol $L^{-1}$ in toluene) are added to the 250 mL bottle.

A further 100 mL of the contents of the 750 mL bottle are added to an inertized 500 mL reactor with stirring (400 rpm, revolutions per minute) and heated to 77° C. The contents of the 250 mL bottle are then transferred into the reactor and the remaining contents of the 750 mL bottle (about 100 mL) complete the filling of the reactor. The reactor is degassed under vacuum until gas bubbles form and is then pressurized to 3 bar with the ethylene/butadiene mixture at an 80/20 mole ratio.

When the desired amount of monomer is consumed, the reactor is degassed. Functionalization is performed with 2 equivalents of 4,4'-bis(diethylamino)benzophenone (DEAB) relative to the total amount of magnesium, dissolved in toluene.

The medium is stirred for 1 h at 77° C. and then cooled and deactivated with ethanol. The polymer is dried under vacuum at 50° C. for 24 h and then weighed.

About 2 g of polymer are dissolved in 20 mL of methylcyclohexane, and the polymer is then precipitated from about 150 mL of acetone. The operation is repeated three times in succession to wash the polymer. The washed and dried polymer is recovered for analysis.

Example EBR-B 310 mL of toluene from a solvent fountain are introduced into a 750 mL Steinie bottle. After sparging with nitrogen for about 10 minutes, 300 mL of toluene are thus recovered. 46 mg (72 μmol of neodymium) of $\{(Me_2Si(C_{13}H_8)_2)Nd(—BH_4)[(—BH_4)Li(THF)]\}_2$ are weighed out in a 250 mL Steinie bottle in a glove box. 1 mL of 2-mesitylmagnesium bromide prepared according to Example 2 (0.5 mol $L^{-1}$ in toluene) is added to the 750 mL bottle. About 100 mL of the contents of the 750 mL bottle are transferred into the 250 mL bottle by a double-headed needle system. 2.3 mL of 1,5-di (magnesium bromide)pentanediyl (DMBP) prepared according to the same method as described in Example 1 (0.43 mol $L^{-1}$ in toluene) are added to the 250 mL bottle.

A further 100 mL of the contents of the 750 mL bottle are added to an inertized 500 mL reactor with stirring (400 rpm) and heated to 77° C. The contents of the 250 mL bottle are then transferred into the reactor and the remaining contents of the 750 mL bottle (about 100 mL) complete the filling of the reactor. The reactor is degassed under vacuum until gas bubbles form and is then pressurized to 3 bar with the ethylene/butadiene mixture at an 80/20 mole ratio.

When the desired amount of monomer is consumed, the reactor is degassed. Functionalization is performed with 2 equivalents of 4,4'-bis(diethylamino)benzophenone (DEAB) relative to the total amount of magnesium, dissolved in toluene.

The medium is stirred for 1 h at 77° C. and then cooled and deactivated with ethanol. The polymer is dried under vacuum at 50° C. for 24 h and then weighed.

About 2 g of polymer are dissolved in 20 mL of methylcyclohexane, and the polymer is then precipitated from about 150 mL of acetone. The operation is repeated three times in succession to wash the polymer. The washed and dried polymer is recovered for analysis.

The conditions for the copolymerization of ethylene and 1,3-butadiene are given in Table 1.

The characteristics of the synthesized copolymers are shown in Table 2 and in Table 3.

The microstructure of the polymers and the functionalization at both polymer chain ends are determined by NMR. The ethylene unit content, the content of 1,3-butadiene unit in the 1,2-configuration (1,2-unit), in the 1,4-configuration (1,4-unit) and the 1,2-cyclohexane unit content (ring unit) are expressed as molar percentages relative to the total units of the polymer.

Results:

The results show that the use in the copolymerization of ethylene and 1,3-butadiene of a catalytic system based on a rare-earth metallocene and a co-catalyst containing two magnesium-carbon bonds involving different magnesium atoms, such as DMBP, allows the synthesis of telechelic polymers according to the invention. The polymer is a copolymer of ethylene and 1,3-butadiene which comprises 1,2-cyclohexane units in its polymer chain. The functional groups at the ends of the polymer chain are identical. The macrostructure of the polymers is well defined by a dispersity of less than 1.5 or by a number-average molar mass of greater than 10 000 g/mol.

TABLE 1

| Polymer | Co-catalyst | Mole ratio Mg/Nd | Time (min) |
|---|---|---|---|
| EBR-A | DBMP | 28 | 127 |
| EBR-B | DBMP | 35 | 110 |

TABLE 2

| Polymer | $M_n$ SEC (g $mol^{-1}$) | Đ | Chain ends |
|---|---|---|---|
| EBR-A | 8470 | 1.18 | $[N(CH_2CH_3)_2]$ |
| EBR-B | 13520 | 1.18 | $N(CH_2CH_3)_2]$ |

TABLE 3

| Polymer | Ethylene unit | 1,2 Unit | 1,4 Unit | Ring unit |
|---|---|---|---|---|
| EBR-A | 79.3 | 5.1 | 4.1 | 11.5 |
| EBR-B | 80.8 | 4.2 | 3.5 | 11.5 |

The invention claimed is:

1. A telechelic polymer of formula (I)

$$Z_1\text{-POLY-}Z_2 \quad (I)$$

in which the term "POLY" denotes a polymer chain comprising units of a 1,3-diene, ethylene units and cyclic units, 1,2-cyclohexane units of formula (II),

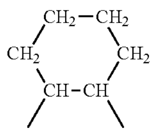

(II)

$Z_1$ and $Z_2$ denoting a group containing a functional group, $Z_1$ and $Z_2$ being identical, which polymer has a macrostructure defined by a dispersity of less than 1.5 or by a number-average molar mass of greater than 10,000 g/mol.

2. The telechelic polymer according to claim 1, in which the polymer chain is a copolymer chain of a 1,3-diene and ethylene or a terpolymer chain of a 1,3-diene, ethylene and an α-monoolefin.

3. The telechelic polymer according to claim 1, in which the 1,3-diene is 1,3-butadiene or a mixture of 1,3-dienes, one of which is 1,3-butadiene.

4. The telechelic polymer according to claim 1, in which the polymer chain contains more than 50 mol % of ethylene units.

5. The telechelic polymer according to claim 1, in which the polymer chain contains not more than 15 mol % of 1,2-cyclohexane units.

6. The telechelic polymer according to claim 1, in which the polymer chain is a statistical copolymer chain.

7. The telechelic polymer according to claim 1, in which $Z_1$ and $Z_2$ denote a group comprising an alcohol, amine, halogen, carbonyl, alkoxysilane or silanol function.

8. The telechelic polymer according to claim 1, in which the macrostructure is defined by a number-average molar mass of greater than 10,000 g/mol.

9. The telechelic polymer according to claim 8, in which the macrostructure is defined by a dispersity of less than 1.5.

10. The telechelic polymer according to claim 1, which polymer contains within the polymer chain "POLY" a divalent group R, an aliphatic hydrocarbon-based chain, interrupted or not with one or more oxygen or sulfur atoms or one or more arylene groups, R being other than an ethylene unit, a 1,3-diene unit, a chain of ethylene units, a chain of 1,3-diene units, a chain of units consisting of one or more ethylene units and one or more 1,3-diene units.

11. The telechelic polymer according to claim 10, in which the divalent group R is a branched or linear alkanediyl, a cycloalkanediyl or a xylenediyl radical.

12. The telechelic polymer according to claim 10, in which the divalent group R is an alkanediyl.

13. The telechelic polymer according to claim 10, in which the divalent group R contains from 3 to 10 carbon atoms.

14. The telechelic polymer according to claim 8, in which the macrostructure is defined by a number-average molar mass of greater than 20,000 g/mol.

* * * * *